United States Patent Office 2,789,490
Patented Apr. 23, 1957

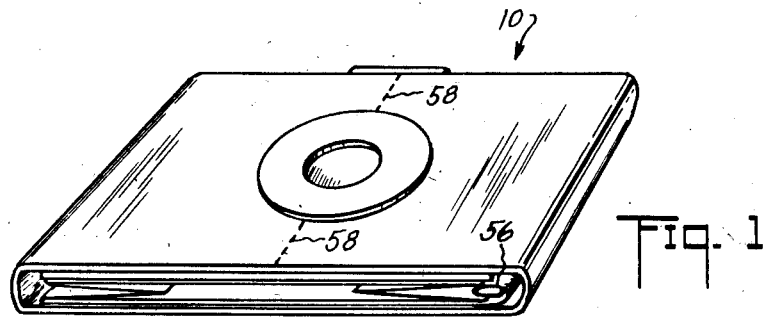
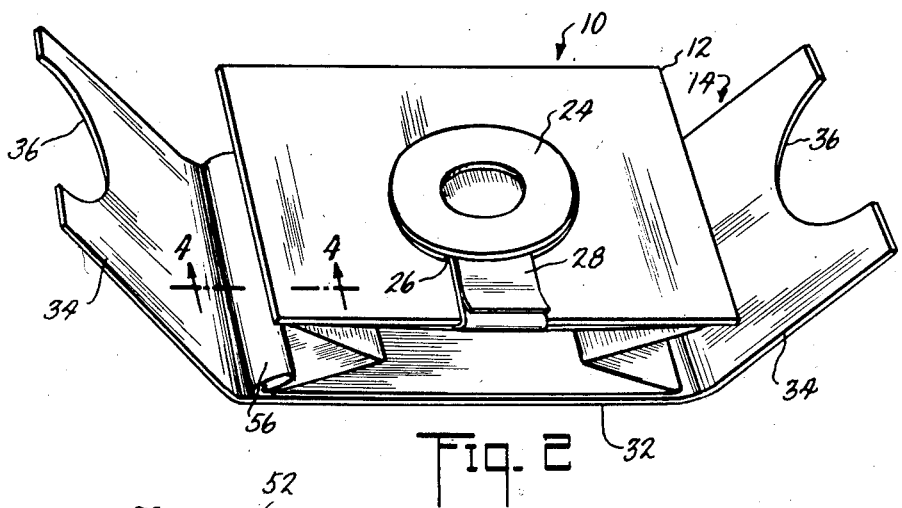
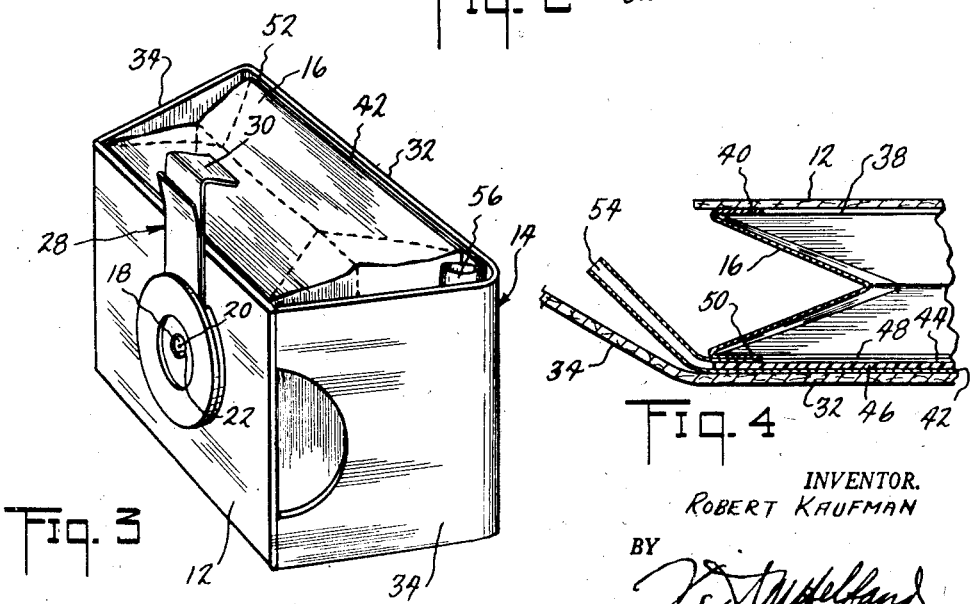
INVENTOR.
ROBERT KAUFMAN

2,789,490

FOLDING PIN HOLE CAMERA

Robert Kaufman, New York, N. Y.

Application January 25, 1954, Serial No. 406,023

1 Claim. (Cl. 95—39)

The present invention relates to a camera.

The primary object of the present invention is the provision of a pinhole camera of generally simplified construction which can be manufactured of inexpensive material and sold at a very low price.

Another object is the provision of a camera which can be readily folded for mailing purposes and which can be used for an advertising medium by having printed matter thereon.

Another object is the provision of a pinhole camera fabricated of flexible sheet material which can be readily folded and collapsed for mailing or storage.

A further object is the provision of a pinhole camera which is simple to assemble and to operate.

The above and other objects, features and advantages of the present invention will be more fully understood from the following description considered in connection with the accompanying illustrative drawings.

In the drawings which illustrate the best mode contemplated by me of carrying out my invention:

Fig. 1 is a perspective view of a camera pursuant to the present invention, the camera being illustrated in the sealed and folded condition thereof;

Fig. 2 is a view similar to Fig. 1, with the seal broken;

Fig. 3 is a perspective view of the camera in operative condition thereof; and

Fig. 4 is a fragmentary sectional view taken on the line 4—4 of Fig. 2.

Referring now to the drawings in detail, the pinhole camera 10 is formed of the resilient sheet material blanks 12 and 14, which constitute the camera casing or housing, and a flexible sheet material bellows 16 interposed between said blanks. More specifically, the rectangular blank 12, preferably formed of card board or the like, constitutes the front wall of the camera. The pinhole lens for the camera is constituted by a metallic disc 18, provided with a pinhole 20. The front wall 12 is apertured centrally thereof, as at 22, and the disc 18 is secured to the inner surface of said wall to cover the aperture. A centrally apertured cardboard disc 24 is secured to the outer surface of the front wall 12 and is provided with a cut-out portion 26 which defines a guideway for a shutter 28, preferably formed of stiff paper or other suitable sheet material. The shutter is provided with a flap or finger grip 30 to facilitate the operation thereof to uncover and to cover the pinhole 20.

The previously mentioned blank 14 constitutes the rear and side walls of the camera. More specifically, the blank 14 is preferably formed of cardboard and is provided with the central portion 32 thereof, which forms the rear wall of the camera. The foldable tabs 34 thereof form the side walls of the camera. The tabs are each provided with a semi-circular cut-out 36 to accommodate the disc 24 in the folded condition of the camera, as in Fig. 1.

The bellows 16 is preferably formed of relatively stiff paper, or the like. The open front 38 of the bellows is secured to the rear surface of the front wall 12, as at 40, in Fig. 4. A film pocket or holder 42, preferably formed of relatively stiff paper or the like, is secured to the inner surface of the rear wall 32. Said pocket is provided, in its surface which is in opposition to the front wall 12, with a preferably rectangular opening 44 which frames the film 46, when inserted in said pocket. The open rear end 48 of the bellows 16 registers with the film opening 44 and is secured to the film pocket, as at 50. Therefore, it will be apparent that a light tight chamber is defined by the bellows 16, the front wall 12 and the film pocket 42, the pinhole 20 being at the front end of the chamber and the film 46 being disposed in the pocket 42 at the opposite end of the chamber.

The film pocket or holder is permanently closed at the end thereof, as at 52, being open at the other end 54 thereof, for inserting and removing the sheet film 46. In order to provide a seal for the film holder, the open end 54 thereof is folded over on itself, as illustrated at 56.

When the camera 10 is originally assembled and is collapsed for mailing or the like, the camera is in the condition thereof illustrated in Fig. 1. As shown therein, the semi-circular cut-outs 36 of the tabs 34 encompass the shutter holder disc 24 and the tab ends are sealed together to retain the camera in said collapsed and folded condition. In addition the shutter tab 30 is positioned between the folds of the bellows 16. The seal may be readily slit along the broken line 58, whereupon, due to the inherent resiliency of the bellows 16 and the flexibility of the blank 14, the camera assumes the condition thereof illustrated in Fig. 2. The camera may now be readily placed in operative condition by pulling the front and rear walls 12 and 32, respectively, apart to expand the bellows, until the tabs 34 snap into position behind the front wall, as illustrated in Fig. 3, to retain the camera in said condition thereof. With a film in position in the film holder, an exposure may be made in the usual manner by pointing the front of the camera at the subject and then lifting the shutter 28 by its tab 30 to uncover the pinhole lens 20 for exposing the film 46. At the end of the exposure time, the shutter is pushed down into its holder 24 to cover the pinhole. The camera may now be folded and collapsed by pushing out the tabs 34 from behind the front wall 12, pushing the front wall toward the rear wall 32 and folding the tabs 34 over the front wall. The camera may be retained in its collapsed or closed condition by using a rubber band or the like.

From the foregoing, it will be apparent that the present invention provides a simple inexpensive pinhole camera which can be readily folded and collapsed when not in use or for mailing or the like.

While I have shown and described the preferred embodiment of my invention, it will be understood that various changes may be made in the present invention without departing from the underlying idea or principles of the invention within the scope of the appended claim.

Having thus described my invention, what I claim and desire to secure by Letters Patent, is:

A foldable camera, comprising a first blank of sheet material constituting the front wall of the camera, a second blank of sheet material constituting the rear wall of the camera, a bellows secured between said first and second walls to define a light tight chamber with said walls, said first wall having opposed edge portions overlapping said bellows, said second wall having relatively rigid, lateral extensions foldable over said first wall when said camera is in folded position and engageable against said overlapping portions of said front wall to maintain said bellows in extended position for picture taking, said first wall having an opening formed therein, a metallic disc having a pinhole formed therein secured against said first wall opposite said opening with said pinhole in register therewith, shutter means for said pinhole slidably mounted on said first wall, and a film holding pocket of flexible sheet material provided on said second wall within said chamber, said pocket having an open end extension extending outwardly of said chamber for inserting and removing film therethrough, said open said extension being foldable upon itself to form a light-tight closure for said pocket inwardly of and adjacent to an extension of said second wall.

References Cited in the file of this patent

UNITED STATES PATENTS

| | | |
|---|---|---|
| 260,605 | Price | July 4, 1882 |
| 473,358 | Servis | Apr. 19, 1892 |
| 1,298,312 | Earle | Mar. 25, 1919 |
| 1,366,158 | Brown | Jan. 18, 1921 |